US009753948B2

(12) United States Patent
Lo

(10) Patent No.: US 9,753,948 B2
(45) Date of Patent: Sep. 5, 2017

(54) FACE SEARCH IN PERSONALS

(75) Inventor: Kin Man Lo, Kowloon (CN)

(73) Assignee: MATCH.COM, L.L.C., Dallas, TX (US)

(*) Notice: Subject to any disclaimer, the term of this patent is extended or adjusted under 35 U.S.C. 154(b) by 1472 days.

(21) Appl. No.: 12/127,577

(22) Filed: May 27, 2008

(65) Prior Publication Data
US 2009/0299961 A1 Dec. 3, 2009

(51) Int. Cl.
G06F 17/30 (2006.01)
G06F 7/00 (2006.01)
G06K 9/00 (2006.01)
G06K 9/62 (2006.01)
G06Q 10/10 (2012.01)

(52) U.S. Cl.
CPC ... G06F 17/30247 (2013.01); G06K 9/00288 (2013.01); G06K 9/6247 (2013.01); G06Q 10/10 (2013.01)

(58) Field of Classification Search
CPC .............. G06F 17/30793; G06K 9/00221
USPC ................... 707/769, 733; 382/118
See application file for complete search history.

(56) References Cited

U.S. PATENT DOCUMENTS

| 5,164,992 | A | * | 11/1992 | Turk et al. ............... 382/118 |
| 5,450,504 | A | * | 9/1995 | Calia ........................ 382/118 |
| 5,933,829 | A | | 8/1999 | Durst et al. |
| 5,938,721 | A | | 8/1999 | Dussell et al. |
| 5,978,773 | A | | 11/1999 | Hudetz et al. |
| 6,038,295 | A | | 3/2000 | Mattes |
| 6,038,333 | A | * | 3/2000 | Wang ............... G06K 9/00221 382/118 |
| 6,044,168 | A | * | 3/2000 | Tuceryan et al. ............ 382/118 |
| 6,091,957 | A | | 7/2000 | Larkins et al. |
| 6,108,656 | A | | 8/2000 | Durst et al. |
| 6,125,326 | A | | 9/2000 | Ohmura et al. |
| 6,199,048 | B1 | | 3/2001 | Hudetz et al. |
| 6,385,541 | B1 | | 5/2002 | Blumberg et al. |
| 6,430,554 | B1 | | 8/2002 | Rothschild |
| 6,434,561 | B1 | | 8/2002 | Durst, Jr. et al. |
| 6,542,933 | B1 | | 4/2003 | Durst, Jr. et al. |
| 6,651,053 | B1 | | 11/2003 | Rothschild |
| 6,675,165 | B1 | | 1/2004 | Rothschild |
| 6,766,363 | B1 | | 7/2004 | Rothschild |
| 6,865,608 | B2 | | 3/2005 | Hunter |
| 6,983,478 | B1 | | 1/2006 | Grauch et al. |
| 6,993,573 | B2 | | 1/2006 | Hunter |
| 7,130,454 | B1 | * | 10/2006 | Berube ............. G06K 9/00234 382/118 |
| 7,133,555 | B2 | | 11/2006 | Acharya et al. |

(Continued)

FOREIGN PATENT DOCUMENTS

JP 2002-183186 6/2002
JP 2002-183186 A 6/2002

(Continued)

OTHER PUBLICATIONS

Shlens, J., "A Tutorial on Principal Component Analysis," Systems Neurobiology Laboratory, Salk Institiute for Biological Studies, Dec. 10, 2005.

(Continued)

*Primary Examiner* — Kuen Lu
(74) *Attorney, Agent, or Firm* — Patent Capital Group

(57) ABSTRACT

A device, system and method to enable searching of personal profiles in the context of on-line dating that includes the ability to determine the personal profiles that have images that most closely resemble a target image.

19 Claims, 7 Drawing Sheets

(56) References Cited

U.S. PATENT DOCUMENTS

| | | | |
|---|---|---|---|
| 7,191,164 B2* | 3/2007 | Ray et al. | 706/52 |
| 7,362,886 B2* | 4/2008 | Rowe et al. | 382/118 |
| 7,457,705 B2 | 11/2008 | Takahashi et al. | |
| 7,523,132 B2 | 4/2009 | Altounian et al. | |
| 7,535,492 B2 | 5/2009 | Kahn et al. | |
| 7,565,139 B2 | 7/2009 | Neven, Sr. et al. | |
| 7,620,026 B2 | 11/2009 | Anschutz et al. | |
| 7,627,152 B2 | 12/2009 | Mathew et al. | |
| 7,860,854 B2* | 12/2010 | Lipson et al. | 707/707 |
| 8,098,894 B2 | 1/2012 | Soderstrom | |
| 8,406,531 B2 | 3/2013 | Ramanujapuram et al. | |
| 8,478,000 B2 | 7/2013 | Soderstrom | |
| 2001/0026631 A1* | 10/2001 | Slocum et al. | 382/115 |
| 2001/0036224 A1* | 11/2001 | Demello et al. | 375/220 |
| 2002/0019819 A1 | 2/2002 | Sekiguchi et al. | |
| 2002/0072815 A1 | 6/2002 | McDonough et al. | |
| 2002/0101539 A1 | 8/2002 | Yokota | |
| 2002/0147029 A1 | 10/2002 | Wu | |
| 2004/0100652 A1 | 5/2004 | Cooper | |
| 2004/0247177 A1* | 12/2004 | Rowe et al. | 382/159 |
| 2005/0004749 A1 | 1/2005 | Park | |
| 2005/0162523 A1 | 7/2005 | Darrell et al. | |
| 2005/0185060 A1 | 8/2005 | Neven | |
| 2005/0280502 A1* | 12/2005 | Bell | 340/5.83 |
| 2006/0012677 A1 | 1/2006 | Neven et al. | |
| 2006/0155466 A1 | 7/2006 | Kanda et al. | |
| 2006/0164382 A1 | 7/2006 | Kulas et al. | |
| 2006/0188849 A1* | 8/2006 | Shamaie | G06K 9/00355 434/85 |
| 2006/0221077 A1* | 10/2006 | Wright | G06F 17/30554 345/428 |
| 2006/0240862 A1 | 10/2006 | Neven et al. | |
| 2006/0242565 A1 | 10/2006 | Makela | |
| 2007/0088497 A1 | 4/2007 | Jung | |
| 2007/0106721 A1* | 5/2007 | Schloter | G06F 17/30864 709/200 |
| 2007/0159522 A1 | 7/2007 | Neven | |
| 2007/0298766 A1 | 12/2007 | Fan et al. | |
| 2008/0019564 A1 | 1/2008 | Murata et al. | |
| 2008/0064374 A1* | 3/2008 | Coffing | G06Q 10/10 455/414.1 |
| 2008/0089288 A1 | 4/2008 | Anschutz et al. | |
| 2008/0104649 A1 | 5/2008 | Naaman et al. | |
| 2008/0200153 A1 | 8/2008 | Fitzpatrick et al. | |
| 2009/0083232 A1 | 3/2009 | Ives et al. | |
| 2009/0116749 A1* | 5/2009 | Cristinacce | G06K 9/621 382/195 |
| 2009/0187569 A1* | 7/2009 | Lubarski | G06F 17/3089 |
| 2009/0285492 A1 | 11/2009 | Ramanujapuram et al. | |
| 2009/0316951 A1 | 12/2009 | Soderstrom | |
| 2010/0231609 A1* | 9/2010 | Chatting | G06T 3/0012 345/660 |
| 2010/0309226 A1 | 12/2010 | Quack et al. | |
| 2011/0123120 A1 | 5/2011 | Quack | |
| 2012/0020522 A1 | 1/2012 | Soderstrom | |
| 2012/0191755 A1 | 7/2012 | Naaman et al. | |

FOREIGN PATENT DOCUMENTS

| | | |
|---|---|---|
| JP | 2005134352 A | 5/2005 |
| JP | 2006023193 A | 1/2006 |
| JP | 2006059136 A | 3/2006 |
| KR | 10-2005-0013445 | 2/2005 |
| KR | 10-2005-078136 A | 8/2005 |
| WO | 2006-043319 A1 | 4/2006 |
| WO | 2008-040004 A2 | 4/2008 |
| WO | 2008-068849 A1 | 6/2008 |

OTHER PUBLICATIONS

Turk, M. et al., "Eigenfaces for Recognition," *J. Cognitive Neuroscience*, 3:1, 1991.

Pissarenko, D., "Eigenface-based facial recognition," http://openbio.sourceforge.net/resources/eigenfaces/eigenfaces-html/facesOptions.html, printed May 23, 2008.

Goldwasser, D., "A Brief Introduction to GPS Photo Linking," Jun. 15, 2004, pp. 1-5 http://wwvv.macdevcenter.com/lpt/a/4941.

Bishop, T., "Microsoft Notebook: Research team blends digital images and GPS," Feb. 16, 2004, pp. 1-3 http://seattlepi.nwsource/business/160723_msftnotebook16.html.

Klika, "TripTrackernet," Aug. 11, 2006, pp. 1-2 http://triptracker.net/about/.

Early, J., "GPS Photo Linker," Aug. 11, 2006, pp. 1-2, and photo http://oregonstate.edu/~earlyj/gpsphotolinker/index.php http://oregonstate.edu/~earlyj/gpsphotolinker/images/match_mode130.jpg.

Microsoft Corporation, "Welcome to the World-Wide Media eXchangel," Apr. 7, 2005, pp. 1-2 http://wwmx.org.

Microsoft Corporation, "World-Wide Media eXchange: FAQ," Apr. 7, 2005, pp. 1-2 http://wwmx.org/FAQ.aspx.

Sony Electronics, Inc., "Organize Photos by 'Where' not 'When' with Global Positioning System for Sony Digital Cameras," Aug. 1, 2006, pp. 1-2 and photo http://news.sel.sony.com/en/press_room/consumer/digital_imaging/release/23893.html http://news.sel.sony.com/images/large/consumer/digital_imaging/map_image04_lg.jpg.

Wallace, M., "Automatically Geotag Your Digital Photos," Aug. 3, 2006, pp. 1-2 http://wwww.unmediated.org/archives/2006/08/automatically_g.php.

Official Communication for U.S. Appl. No. 11/555,249 mailed Jun. 10, 2009.

Official Communication for U.S. Appl. No. 11/555,249 mailed Dec. 29, 2009.

Official Communication for U.S. Appl. No. 11/555,249 mailed Mar. 9, 2010.

Official Communication for U.S. Appl. No. 11/555,249 mailed Jul. 6, 2010.

Official Communication for U.S. Appl. No. 11/555,249 mailed Oct. 26, 2010.

Official Communication for U.S. Appl. No. 11/555,249 mailed Apr. 12, 2011.

Official Communication for U.S. Appl. No. 11/555,249 mailed Sep. 16, 2011.

Official Communication for U.S. Appl. No. 11/555,249 mailed Feb. 2, 2012.

Official Communication for U.S. Appl. No. 13/252,003 mailed May 1, 2012.

Official Communication for Chinese Patent Application No. 200980123321.8 issued Jun. 1, 2012.

Official Communication for Chinese Patent Application No. 200980123321.8 issued Oct. 10, 2011.

Official Communication for Korean Patent Application No. 10-2011-7001509 issued Jan. 31, 2012.

Official Communication for Korean Patent Application No. 10-2010-7028223 issued Feb. 6, 2012.

Official Communication for U.S. Appl. No. 12/121,259 mailed Jan. 13, 2012.

Official Communication for U.S. Appl. No. 12/121,259 mailed Apr. 12, 2012.

Fockler et al., "PhoneGuide: Museum Guidance Supported by On-Device Object Recognition on Mobile Phones," Bauhaus University Weimar, MUM 2005, Christchurch, New Zealand, 2005, pp. 3-10.

Dao et al., "Location-Based Services: Technical and Business Issues," GPS Solutions, 2002, pp. 169-178

Official Communication for U.S. Appl. No. 12/143,527 mailed Jun. 28, 2011.

Official Communication for U.S. Appl. No. 12/143,527 mailed Oct. 20, 2011.

Official Communication in Taiwanese Patent Application No. 098114686 dated Sep. 21, 2012.

Official Communication in Japanese Patent Application No. 2011-509529 mailed Oct. 25, 2012.

Official Communication in Japanese Application No. 2011-514663 mailed Aug. 30, 2012.

(56) References Cited

OTHER PUBLICATIONS

Official Communication in U.S. Appl. No. 13/252,003 mailed Nov. 2, 2012.
Official Communication in U.S. Appl. No. 13/252,003 mailed Oct. 9, 2012.
Official Communication in U.S. Appl. No. 12/121,259 mailed Oct. 17, 2012.
Qode Patents, Neomedia Technologies, Inc., 4 pages http://www.paperclick.com accessed Feb. 8, 2008.
Amazon Japan Offers Barcode Purchases via Camera Phone, Slashdot, 7 pages http://slashdot.org/article.pl?sid=04/11/24/0545244 accessed Feb. 8, 2008.
Lowe, D. G., "Object Recognition from Local Scale-Invariant Features," Procedures of the International Conference on Computer Vision, Corfu, Sep. 1999, 8 pages.
Lienhart, R., "Video OCR: A survey and Practitioner's Guide," in Video Mining, Kluwer Academic Publisher, Intel Corporation, Oct. 2003, pp. 155-184.
Bruns, E. et al., "Enabling Mobile Phones to Support Large-Scale Museum Guidance," IEEE Computer Society, Apr.-Jun. 2007, 10 pages.
Mosquitos Augmented Reality Game, 2 pages http://www.ojom.com/index.php?id=47 accessed Feb. 13, 2008.
Attack of the Killer Virus Augmented Reality Game, 4 pages http://www.ojom.com/index.php?id=46 accessed Feb. 13, 2008.
Action Twister Augmented Reality Game, 3 pages http://www.ojom.com/index.php?id-48 accessed Feb. 13, 2008.
International Search Report and Written Opinion for International Patent Application No. PCT/US2009/041146, dated Dec. 2, 2009.
International Search Report and Written Opinion for International Patent Application No. PCT/US2009/044592, dated Jun. 11, 2010.
Official Communication for U.S. Appl. No. 12/121,259 dated Aug. 3, 2011.

\* cited by examiner

FACE SEARCH IN PERSONALS

TECHNICAL FIELD

The present invention relates generally to enabling a personal search based on an image of a person in the context of on-line dating. More particularly, the invention integrates the ability to search personal profiles based on attributes or characteristics in conjunction with characteristics that are provided through a photograph or image.

BACKGROUND

Online social networking and dating provides opportunities to meet and socialize with new people. The development of such online social networks touch countless aspects of our everyday lives, providing access to people with similar mindsets, desires and interests, enabling us to form partnerships with more people.

One form of on-line social networking is through personals or on-line dating. A personals website allows its users to locate and communicate with other individuals with similar interests and desires. One of the common purposes of a personals website is to provide opportunities to pre-screen individuals in the context of dating. A user of the personals website will typically enter information about themselves, such as their likes, dislikes, activities, hobbies, education level and the like. This information is entered in the form of text or choosing from a standard set of values. The user will also typically include one or more pictures of themselves. The personal profiles can then be electronically searched to find matches. The searching can take many forms. For example, the search can be conducted by one user that is seeking particular attributes of the other users, such as particular height, body type, gender, location and the like. Such a search is simple because the information relating to these attributes is entered in the form of text or predefined values. However, this type of search is limited because the information for the users is often self-generated leading to potential inaccuracies. The attributes also tend to be relatively generic and applicable to many different individuals.

A primary motivation for including a picture with the user profile is so that other users can gauge relative attractiveness and other physical attributes of the user. However, these attributes are highly subjective and difficult to search for, resulting in users having to manually review the pictures of the user profiles. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
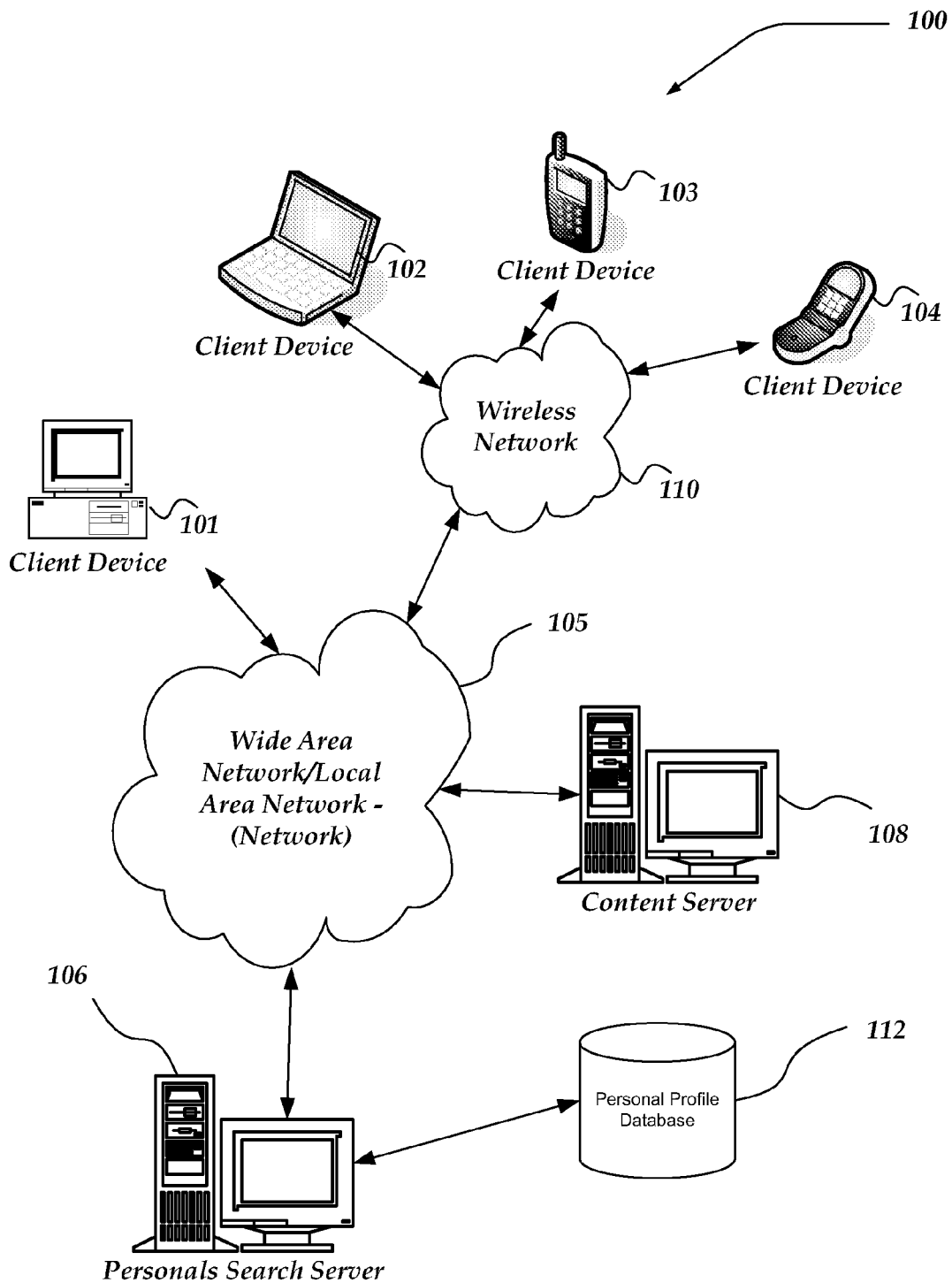
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

Briefly stated, the present invention is directed towards providing a system and method for incorporating the ability to search images that are contained within personal profiles in an on-line match-making service.

Currently, there are many on-line dating and/or match-making services. Some of these are Yahoo! Personals, Match.com, AOL Personals, . . . etc. Most of these services allow the user to provide a personal profile of themselves. A "personal profile" is a collection of personal information that may include biographic information and that is made available to third parties over a network, such as the Internet. A "personal characteristic" is information that a person uses to identify an attribute of themselves, such as their age, ethnicity, height, body type (whether slim, average, athletic, large, . . . etc.), education, general location of where they live, income level, marital status (single, divorced, widowed, separated), eye color, hair color, preferences with respect to children, profession, religion, language spoken, personality traits and the like. These profiles then become part of the personals database. When another user is seeking a suitable match on such a service, the user specifies the personal characteristics that the user would like to see in a potential match.

As part of the profiles, users also include one or more pictures of themselves. The physical appearance of a person may be an important factor in determining whether a profiled individual is a suitable match. These pictures are generally digitized images and may include a picture of the person's face. The present invention permits a search of the pictures in the personal profiles to be included in the personals search. This allows a user to conduct a more exhaustive search.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

In one embodiment of the invention, a user enters a personal characteristic that they are looking for in a potential match in the personal profiles. Next, the user would upload or otherwise select a "target image," which is a picture of a person that has features that the user finds desirable. The desirable features may be that the person has an attractive face. As another example, the desirable feature may be that the person has an attractive body type. The target image is not limited to a face or overall body type, but may also be partial pictures. For instance, the target image can be a picture of a person's eyes that the user finds attractive. In this embodiment, the system would perform a search in the personal profiles using the personal characteristic and then conduct a search within such results by finding the closest match between the target image and the pictures contained within the profiles. The results of the search may then be sorted and presented to the user according to those personal profiles that most closely resemble the target image.

Several methods have been developed for comparing different images and determining the level of correspondence between images. The images themselves can be compared on a pixel by pixel basis. In a picture with a resolution of 100 by 100, the total number of pixels would be 10,000, each with a typical value of between 0 and 255 for eight bit greyscale resolution. However, the computer and network resources that are required to compare even simple images would be very large for even a small set of users. In the context of on-line dating sites, the number of users ranges from thousands to tens of thousands and may exceed hundreds of thousands. Thus, such a method of comparing images may be impractical, depending on the context of use.

In the field of facial recognition, work has been done on detecting, through a computer, individual facial features such as the eyes, nose, mouth, and head, and defining a face model by the position, size and relationships among these features. A second approach is to characterize a face by a set of geometric parameters and performing pattern recognition based on the parameters. There are many other methodologies that are known in the art. However, many of these approaches are not scalable to the real world use in on-line dating sites because of the computational resources required to provide real time or near real time search results.

Space can be 1-D, 2-D, . . . to n-D (where "D" is "Dimension"). For example (x,y) is a point in 2-D space and (x,y,z) is a point in 3-D space. If we have an image having a width W and a height H, the set of data (pixel 1, pixel 2, . . . pixel W×H) can be thought as a point in the W×H dimensional space. If we have N images, there will be N points in the space. One possibility, known to those skilled in the art, is to use methods of dimension reduction to remove unimportant data from a data set. The goal is to transform the N points in the W×H-D space into K-D space, where K<<W×H. The reduced K-D space, when used in the context of representing faces, is called the face space. In mathematical terms, this can be done by a statistical technique called Principal Component Analysis. The PCA orthogonally and linearly transforms the data to a new coordinate system such that the first coordinate of the data has the greatest variance, the corresponding axis is the first principal component; the second coordinate of the data has the second greatest variance, and so on. Dimension reduction is achieved by selecting the first K principal components. A "face space multiplier" is a subset of the principal components that can be used to create a reduced set of data to represent a face. Essentially, these components comprise the largest variation in a set of original images. There is some loss of information. However, the degree of loss can be adjusted by selecting the value of K, and is optimized to retain the most significant information required for accomplishing the objectives of the invention. A "reduced image data set" is a reduced set of data in K dimensions that represents an image which is generated by multiplying the face space multiplier by the mean subtracted image. The dimension of data in the reduced image data set is substantially smaller than the dimension in the original image data. Thus, a comparison between reduced image data sets can be conducted much more quickly and/or use fewer computational resources than such a comparison between original images.

In one embodiment of the invention, a user may request a personal profile search that includes a search for a personal characteristic and a request to match a target image. A subset of reduced image data sets corresponding to personal profiles that contain the personal characteristic is retrieved and compared against the reduced image data set of the target image. The comparison is achieved by using distance calculation. When two points in the face space are close together, this is an indication that the two images look similar. The converse is also true. Where there is a large distance between two points in the face space, such images will not look similar. The images that correspond to the personal profiles would then be sorted according to the distance from the target image in the face space. The personal profiles that are close enough can then be presented to the user.

In another embodiment, the user can decide that the match need only be within a certain percentage of the total number of personal profiles, such as returning the 10% of all profiles that are the closest match for the target image.

In another embodiment, the dimension of the reduced set of data used to calculate the distance in the face space can be dynamically varied according to the availability of system resources. For example, during high use/volume periods, only the dimensions of major principal components within the set of K dimensions are used, thereby reducing the amount of system resources required to complete the comparison between the target image and the images from the personal profiles. But during normal periods, all the K dimensions are used.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/ wide area networks ("WANs")-(network) 105, wireless network 110, client devices 101-104, personals search server 106, and content server 108.

Generally, client devices 102-104 may include virtually any mobile computing device capable of receiving and sending information over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad, a few lines of an LCD display and a built in camera. In another example, a web-enabled client device may have a touch sensitive screen, a stylus, and several lines of color LCD display in which both text and graphics may be displayed.

A web-enabled client device may include a browser application that is configured to receive and to send web pages, web-based information, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate information, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these transmission protocols, and virtually any other transmission protocol may be employed.

Client devices 101-104 may further be configured to include a client application that enables the user to log into a user account that may be managed by another computing device, such as content server 108, personals search server 106, or the like. Such user account, for example, may be configured to enable the user to receive emails, send/receive IM messages, SMS messages, access selected web pages, participate in on-line dating activities, provide messages that may include links or attachments, or the like. However, on-line dating activities may also be performed without logging into the user account.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to connect personals search server 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links; or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of personals search server 106 is described in more detail below in conjunction with FIG. 3. Briefly, however, personals search server 106 may include any computing device capable of connecting to network 105 to enable managing of communication. In one embodiment, personals search server 106 may provide an interface to a user of client devices 101-104 that may be used to post, spread, delete, or otherwise manage communication. Devices that may operate as personals search server 106 may include personal computers, desktop computers, multiprocessor systems, microprocessor-based or programmable consumer electronics, network PCs, servers, or the like. Personals search server 106 may store personal profiles within personal profile database 112.

A request to search personal profiles may be sent through a client device using any variety of communication protocols. As just one example, a user may contact a website through a web browser application. The website may contain several options for developing a profile and for searching through personal profiles. For example, the user may be prompted to enter a brief description about the traits or characteristics that the user is looking for in a potential match. Alternatively, the user may be asked to provide detailed information about themselves, which will be included in the user's own personal profile, before a search is permitted. The user's own personal profile may then be stored, such as in personal profile database 112. The website may also permit a detailed search to be performed based on information regarding each of the personal characteristics.

In one embodiment of the system, one of the prompts from the website to the user will be to designate a picture to use as a target image. In essence, the search through the personal profiles for profile images similar to the target image would be one more search parameter that a user has to search the personal profiles. The user may be provided with the option of uploading an image to the website, for example from client devices 101 through 104. As another example, the user may be provided with a sampling of images and asked to chose from them. The images do not necessarily have to be of a real person, but may alternatively be a set of generic features that mimic an image of an idealized person with certain features. As yet another example, the user may be asked to designate an image from existing personal profiles. In one embodiment, the user may designate more than one image, or may use several images that depict the same subject matter from different orientations. For example, the images may be of a person's face from several different angles. The images may also be of particular features of a person, such as their eyes or overall body. In another embodiment of the system, for a client device with a camera, the system may directly or indirectly access the camera to capture a photo of a subject and upload it seamlessly for searching.

After entry of the search information, the request to search the personal profiles may be sent to personals search server 106. The personals search server would process the search request and execute the request using the information within personal profile database 112 as set forth more specifically below. It should be noted that while FIG. 1 illustrates a use of personals search server 106 to manage communication, the invention is not so limited. For example, as noted above, client devices 101-104 may also be configured with a client application, script, plug-in, widget, applet, or the like, that is configured and arranged to enable the client device to manage communications and/or perform some processing functions. Moreover, in another embodiment, various functions performed by personals search server 106 may be distributed across a plurality of network devices or client devices.

Content server 108 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisioned as well.

Content server 108 may include an interface that may request information from a user of client devices 101-104. For example, content server 108 may provide access to an account, which may request user log-in information. Such log-in information may include a user name, password, or other identifier of the user and/or client device used by the user.

Devices that may operate as content server 108 include, but are not limited to personal computers, desktop computers, multiprocessor systems, microprocessor-based or programmable consumer electronics, network PCs, servers, network appliances, and the like. Moreover, while personals search server 106 and content server 108 are illustrated as distinct devices, the invention is not so limited. For example, in one embodiment, personals search server 106 and content server 108 may be implemented within a single network device, or distributed across a plurality of network devices.

Illustrative Client Environment

Figure 2:
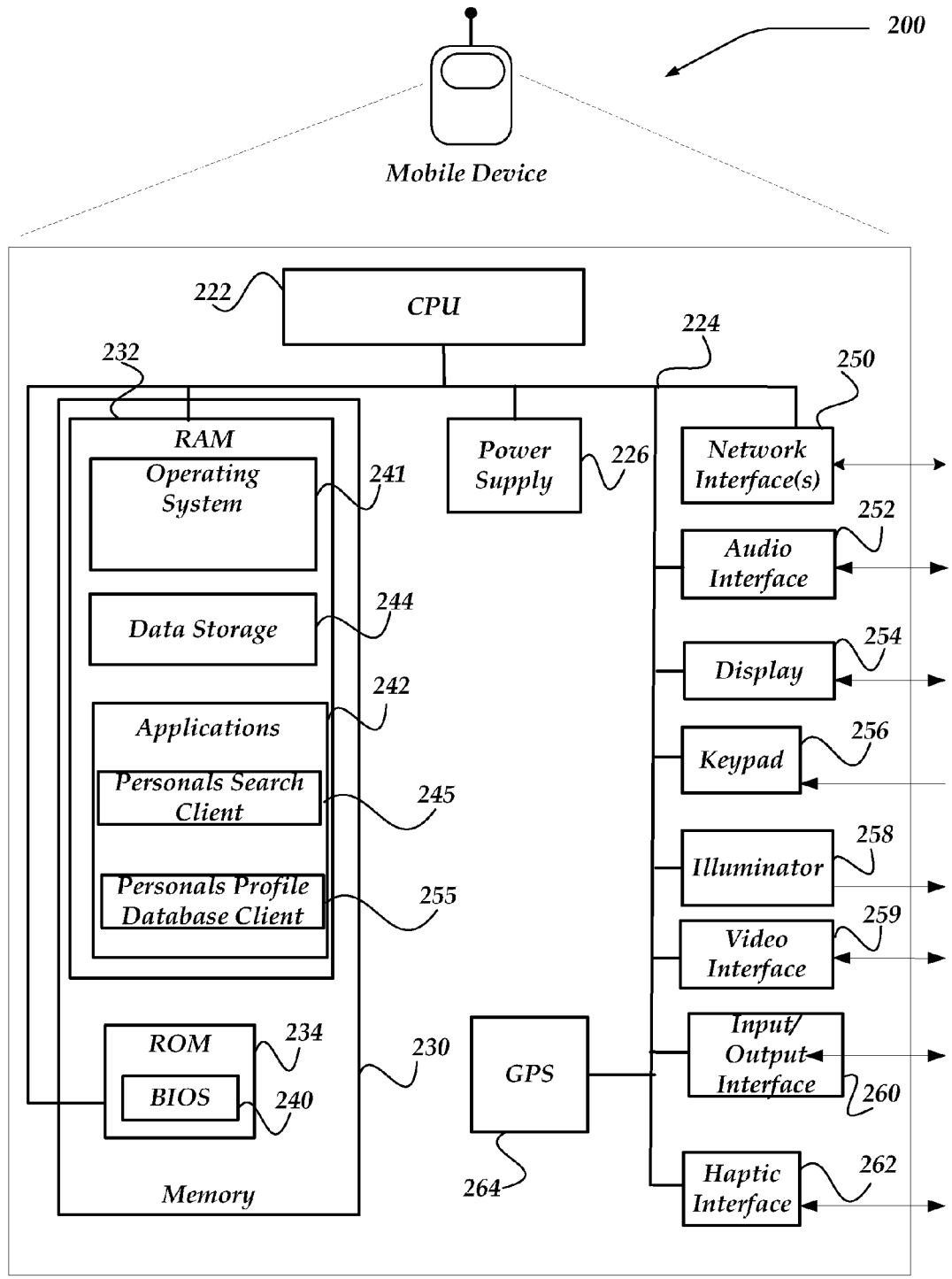
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

In one aspect of the invention, the physical location of the mobile device can be used as an aspect of the personals search. For instance, the personals search may be directed to only those personal profiles within a certain distance from a particular location.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, Y! GO or OneConnect. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may be employed to store information that describes various capabilities of mobile device 200. The information may then be provided to another device based on any of a variety of events, including being sent as part of a header during a communication, sent upon request, or the like. Moreover, data storage 244 may also be employed to store personal information including but not limited to the user's personal profile. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may also include Personals Search Client (PSC) 245 and Personal Profile Database Client (PPDC) 255. PPDC 255 may be any application program for managing the personal profiles database, as described further below. In one embodiment, PSC 245 may be a browser application. In another embodiment, PSC 245 may be a browser application with a downloadable plug-in, script, applet, widget, or the like. Another embodiment may be a non-browser application like midlet, or the like. PSC 245 is configured and arranged to manage communications between the user and the on-line dating site.

PSC 245 may include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like. However, any of a variety of other web based languages may be employed. Although a single PSC 245 is illustrated it should be clear that multiple applications may be employed.

PSC 245 may access Video Interface 259 to access camera to capture photos for user directly for the search.

Illustrative Network Device Environment

Figure 3:
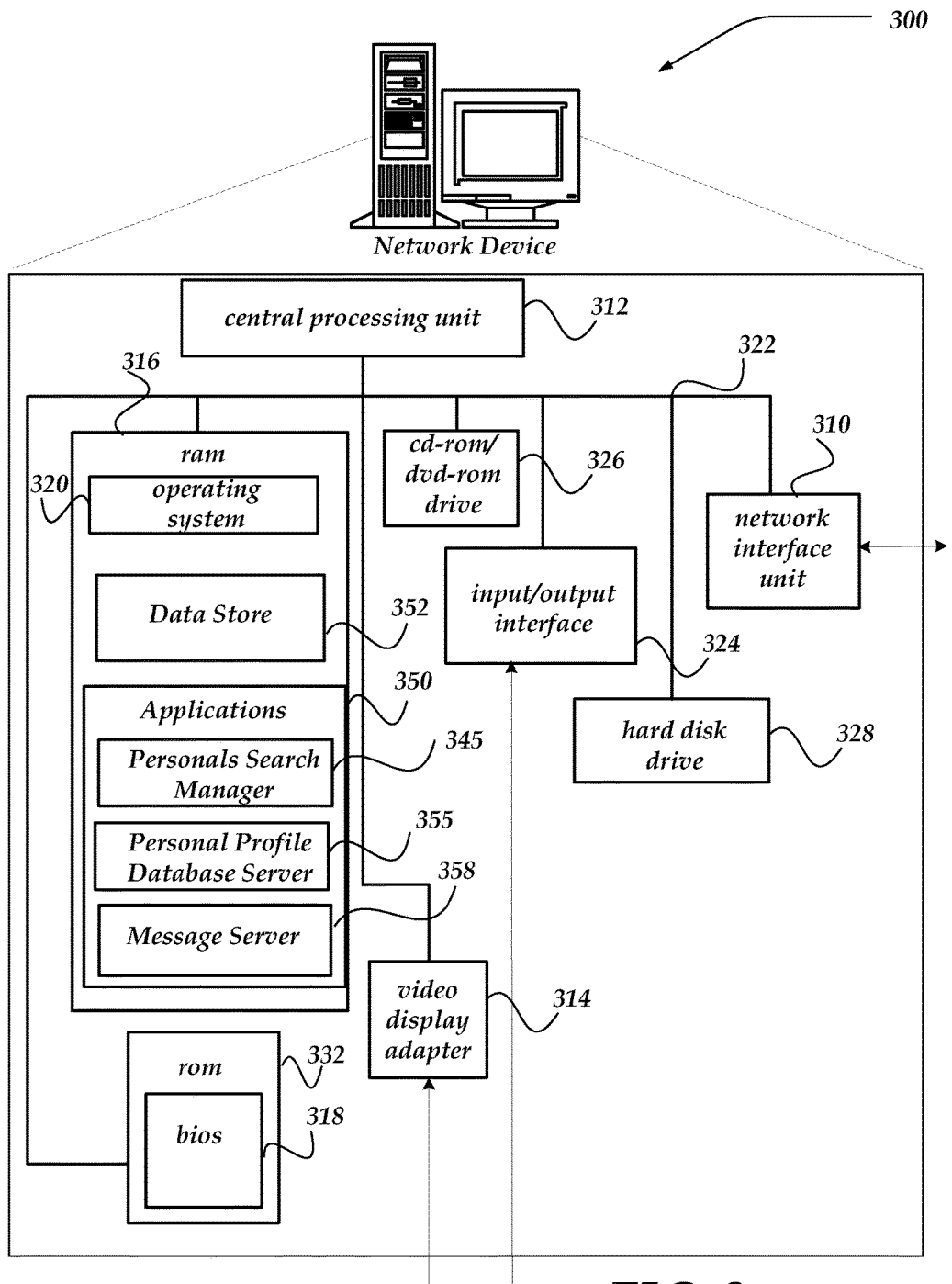
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, Personals Search Server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include PPDS 355, PSM 345 and message server 358. These applications can be based in the network device, in the mobile device, or in a distributed network. Thus, the invention may be implemented in a traditional client server arrangement, in a peer to peer network, through proxy servers or any other architecture. The mass memory can also alternatively store the user's personal profile within data storage 352, and/or cd-rom/dvd-rom drive 326, hard disk drive 328, or other computer readable storage medium (not shown).

In one embodiment, PSM 345 may communicate with PPDS 355 to enable a user to interface with the user's personal profile, and/or to perform personal profile searches. In one embodiment, PPDS 355 may provide a script, applet, application, or other downloadable component, to a client device for use in managing the content of the user's personal profile. In another embodiment, PPDS 355 may provide one or more web pages useable to manage the content of the user's personal profile. In yet another embodiment, the functions of PSM 345 and PPDS 355 may be combined into a single application.

Generalized Operation

Figure 4:
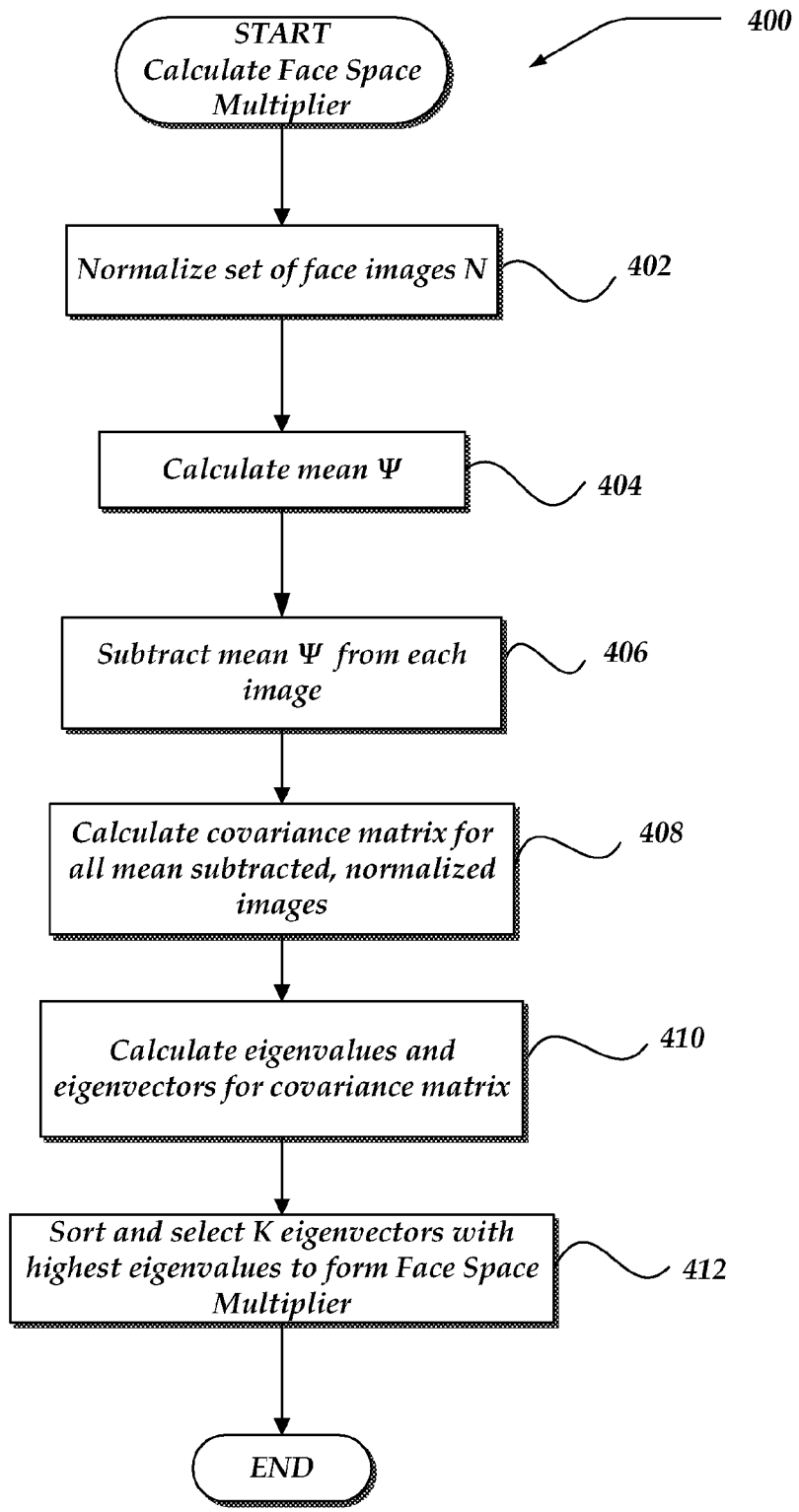
FIG. 4 illustrates a logical flow diagram generally showing one embodiment of a process for calculating a multiplier for generation of a reduced data set.
Figure 5:
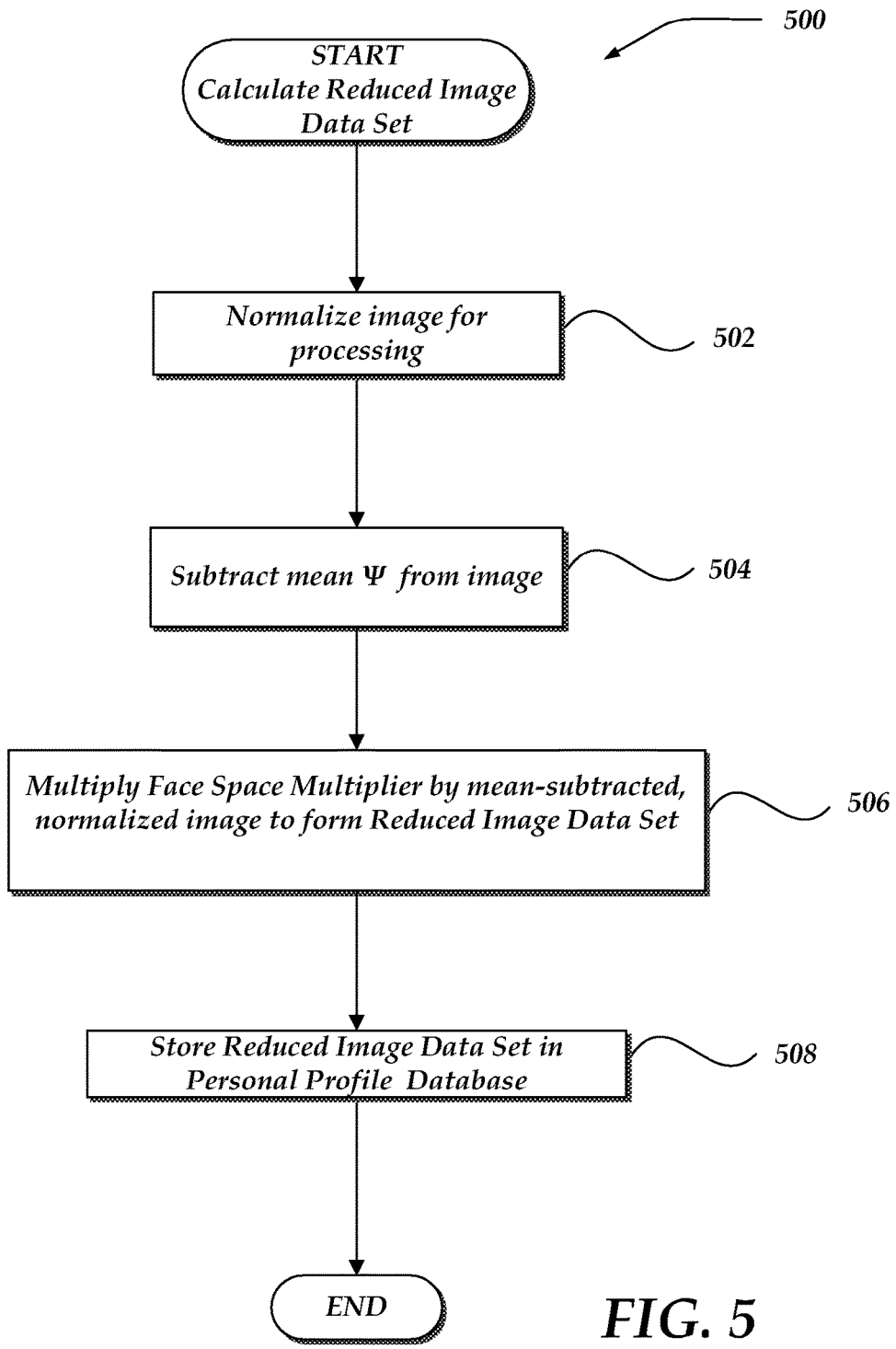
FIG. 5 illustrates a logical flow diagram for calculating the reduced data set from the multiplier.

The operation of certain aspects of the invention will now be described with respect to FIGS. 4 through 6, These figures illustrate the logical flow generally showing one embodiment of a process for implementing a personals search that includes the ability to search images. Processes 400, 500 and 600 of FIGS. 4-6 may be implemented, for example, within Personals Search Server 106 of FIG. 1 or PSM 355 of FIG. 3.

Process 400 shows the logical flow for the creation of the face space multiplier that is used to create a reduced data set for each image that is part of the users' personal profiles or the target image. A reduced data set can be extracted out of image data by means of a mathematical tool called principal component analysis (PCA).

A training set of images is prepared in block 402. This is a set of representative digitized images that are selected to create the face space multiplier. In one embodiment, the images would constitute a set of human faces. The faces can be all the images in the profile database or a representative subset containing enough variants, e.g. males, females, persons with short hair, persons with long hair, etc. In another embodiment, the images do not necessarily have to come from the personal profiles and may come from a standard set or other sources. The set of images should generally be taken under the same conditions such as the same lighting, with the person facing forward, a neutral background, . . . etc. The images should also be relatively the same size. The images may be normalized in block 402 to line up the eyes and mouths, remove the backgrounds, and may be resampled to obtain the same pixel resolution. The normalization process would typically bit include color and brightness adjustments, resulting in grey level images, e.g. with 8-bit 256 grey levels.

Assume that there are N face images in the initial set of images, each image is of W×H=M pixels. Each image can be represented as a M×1 matrix:

$$\begin{bmatrix} p_1 \\ p_2 \\ \vdots \\ p_M \end{bmatrix}$$

This set is represented for convenience as $I_1, I_2, \ldots I_N$. The mean image for the entire training set is calculated in block 404. The average face of the whole face distribution is:

$$\Psi = (I_1 + I_2 + \ldots + I_N)/N$$

Next, in block 406, the mean image is subtracted from each individual image. In other words, in this embodiment, the average face is removed from each individual face:

$$I_i' = I_i - \Psi, \text{for } i=1,2,\ldots,N$$

In block 408, the covariance matrix is calculated for the set of normalized, mean subtracted images. Covariance is the measure of how much two random variables vary together, as distinct from variance, which measures how much a single variable varies. The covariance matrix is an extension to the covariance to measure the correlation of data in multi-dimensions. If $X_i$ is the random variable for the data of pixel $p_i$. The result will be an M×M matrix, where the element at row i, column j is $\text{cov}(X_i, X_j)$.

$$C^{M \times M} = (c_{i,j}, c_{i,j} = \text{cov}(X_i, X_j))$$

The eigenvectors and eigenvalues of the covariance matrix are then calculated as shown in block 410. Because the matrix is symmetric, it has exactly M eigenvalues, and M eigenvectors, one for each eigenvalue. These eigenvectors can be thought of as a set of features that together characterize the variation between the training images. Each image in the training set contributes more or less to each eigenvector. With the human faces as the training set, when the eigenvector is displayed, the result is a sort of ghostly face called an eigenface. Each individual face can be represented exactly by a linear combination of the eigenfaces. The eigenvectors with bigger eigenvalues encodes coarser details and eigenvectors with smaller eigenvalues encodes finer details. With the M eigenvectors created, by discarding some very fine details, only far fewer are required to adequately represent the majority of the information from the original image.

Thus, a subset of K eigenvectors can be selected from those that have the highest eigenvalues. In accordance with this, in block 412 the eigenvalues are sorted from largest to smallest, and a subset of eigenvectors is selected based on a portion of the largest eigenvalues. The face space multiplier is a K×M matrix with sorted eigenvectors as rows, from highest eigenvalue at $1^{st}$ row to lowest at $K^{th}$ row.

In another embodiment of the system, process 412 may remove first several largest principal components to improve system recognition performance.

Basically, the eigenfaces are a set of "standardized face ingredients", derived from statistical analysis of many pictures of faces. Any human face can be considered to be a combination of these standard faces. For example, a face might be composed of 10% from eigenface 1, 55% from eigenface 2, and even −3% from eigenface 3. The values connecting a face to an eigenface can be anywhere from 100% to −100%, the higher the value, the closer the face is to that eigenface. Remarkably, it does not take many eigenfaces summed together to give a fair likeness of most faces. Also, because a person's face is no longer recorded by a digital photograph, but instead as just a list of values (one value for each eigenface in the database used), much less space is taken for each person's face. This reduction permits creation of an on-line dating system that can provide face searching capabilities in real time or near real time.

The value for K will affect the results of the search and the time that it takes to achieve search results. For high values of K, the results of the search will be more accurate. However, the amount of processing resources increases. In determining the value of K, assume E is the number of eigenfaces needed for the exact representation of a face:

If N>=W×H, W×H eigenfaces are needed for exact face representation. Thus, E=W×H.

If N<W×H, there will be N-1 meaningful eigenfaces for exact representation, the remaining will have associated zero eigenvalues. Thus, E=N-1.

There is no theoretical lower limit for the value of N. However, an N>1000 is preferred, and the larger the value the better the results.

For an on-line dating application, the K that provides a good balance between speed and resemblance accuracy should be either the smaller of 1/10 of E or between 100 to 200. As an example, if W=100, H=120, N>>50000 (in the scale of a popular on-line dating system), then N>W×H. Therefore, E=W×H=12000. Since 1/10 of E is 1200, which is greater than 200. So, the K should be 100<K<1200.

Once the face space multiplier is calculated based on an initial set of faces, the original data set can be "projected" into the face space, and a reduced set of data is created which represents the original image, by multiplying the face space multiplier by the normalized, mean subtracted image. This process is shown in FIG. 5. In block 502, an image to be processed is normalized using the same method as in block 402. The mean $\Psi$ is subtracted from the image in block 504. The face space multiplier is multiplied by the mean-subtracted, normalized image in block 506. This creates a reduced set of data that is representative of the image. This data may then be stored in the personal profile database as shown in block 508, or this data may be compared against other reduced image data sets to determine how close the data is together in the face space. This process would be carried out for each of the images in the personal profile database and saved in their associated personal profiles.

If the face space multiplier is created using images in the personal profile database, ideally, the mean face value $\Psi$, the eigenvectors/eigenvalues and the reduced data set for the images of personal profiles are recalculated as more faces are added to the database. Practically, it would not be done that often because these processes are very computational heavy when dealing with the on-line dating scale of faces. As an alternative, when more faces are added to the database, e.g. new users join or when the existing faces are updated, e.g. users updating their profile images, the process described in FIG. 5 is performed for each new image to create a reduced data set which is then stored within the personal profile database. This can be done quickly since it is simple matrix arithmetic. As a result, the new faces are readily available for searches. Re-calculation would not be done at this point. In one embodiment, an offline process can be scheduled, which runs periodically and infrequently, that performs the processes described in FIG. 4 to create the face space multiplier from the images currently contained within the personal profile database. This process would also have to update the mean, eigenvectors/eigenvalues and the reduced data set for all of the faces to reflect the introduction of the new faces in the database. In one embodiment, the image normalization may not be re-executed if it was saved when it is done for the first time. This recalculation process is slow and requires very heavy computational resources. When the process is finished, it is immediately swapped to production to serve queries to the personal profile database. When the database grows larger and larger, this process can be run less and less frequently. Since the system has read more and more faces, the principal components that the system generates are more and more representative for human faces.

In essence, faces that are similar to each other will appear close to each other in the face space. Thus, the similarities between faces can be determined by calculating their "distance" from each other in the face space. All faces of the same individual are supposed to be close to each other while different persons have different face clusters. One approach is to calculate the Euclidian distance between the reduced image data set of the target image and all (or selected) reduced image data sets contained within the personal profiles.

Figure 6A:
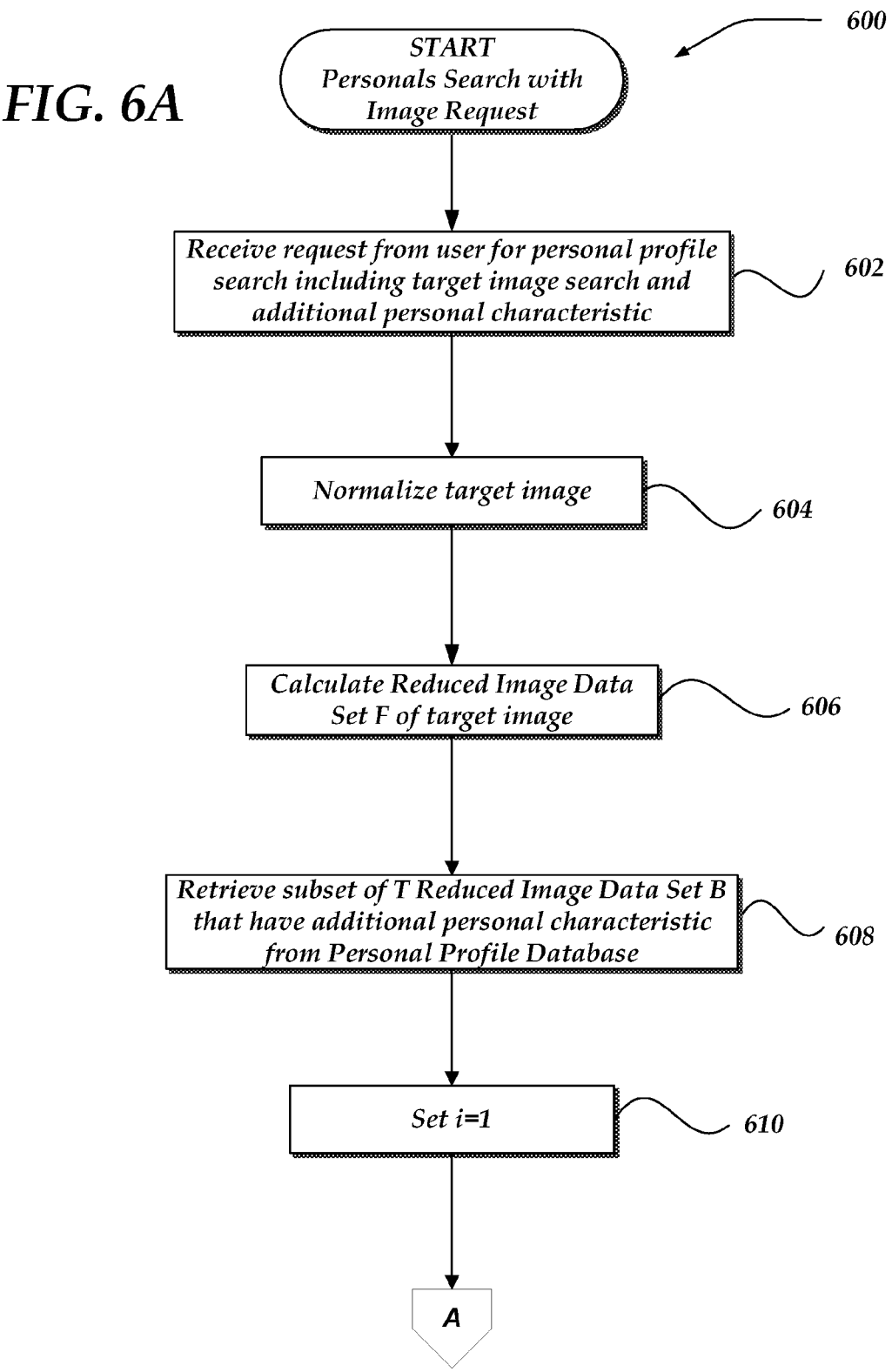
FIG. 6A illustrates a logical flow diagram showing one embodiment of the process for implementing a personals search that includes an image search.
Figure 6B:
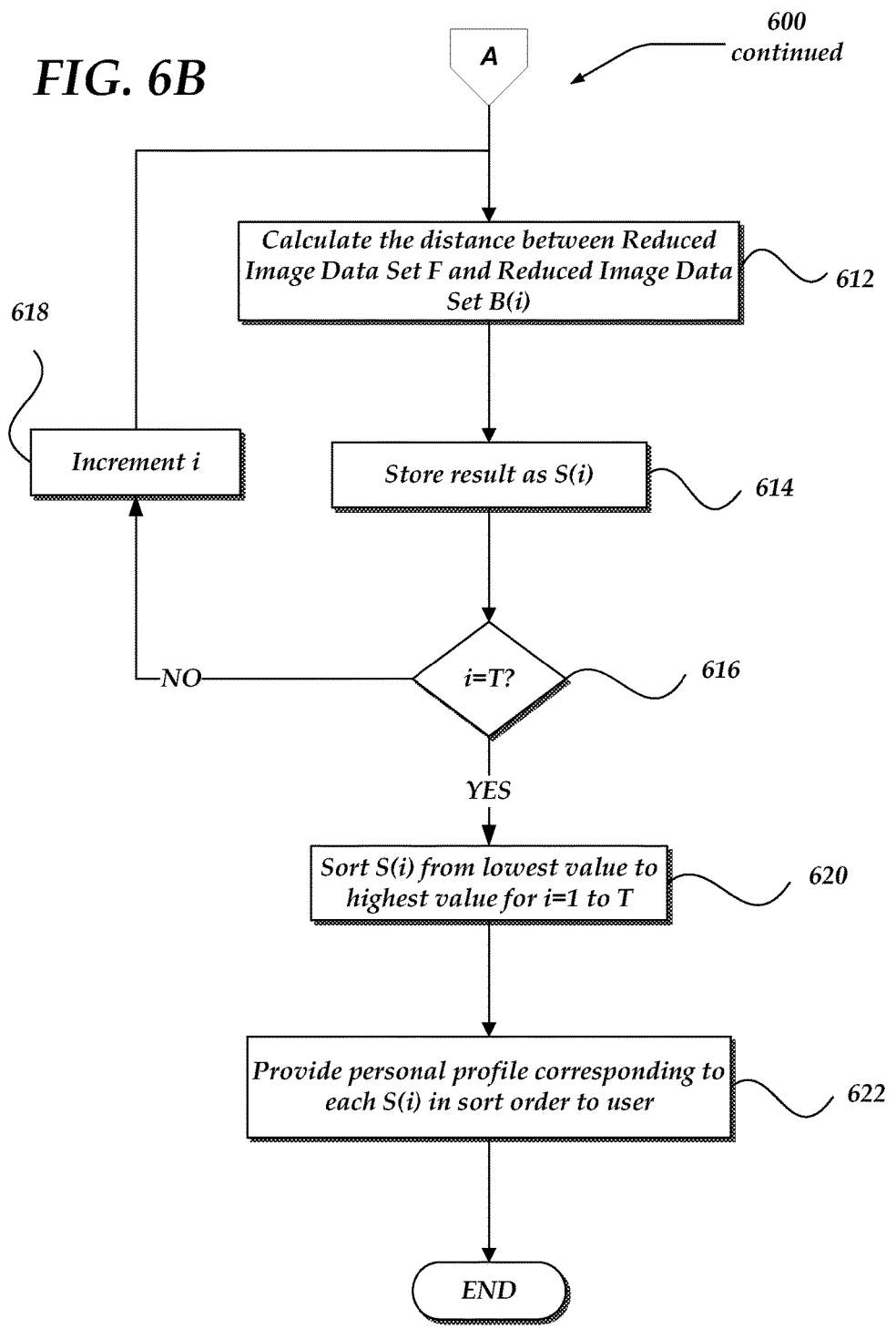
FIG. 6B illustrates a continuation of the logical flow diagram of FIG. 6A for implementing a personals search that includes an image search.

The process for conducting a personal profile search request that includes a request to search for an image is shown in FIGS. 6A and 6B. A request is received in block 602, for instance by PSM 345 of FIG. 3 or PSS of FIG. 1. This request to search personal profiles may include a face search request or may include the combination of a face search and an additional personal characteristic. The image is then retrieved and normalized in block 604 using the same method as in block 402. The reduced image data set F is then calculated in block 606, which is the process as previously described with respect to FIG. 5. Next, in block 608, a subset of T reduced image data sets B is retrieved from the personal profiles that match the personal characteristic. For example, if a person is searching the personal profiles for a male between the ages of 30 and 40 that has similar facial features to an ex-boyfriend, then the personal characteristics would be "male" with an age "between 30 and 40." The reduced image data sets that would be retrieved from the personal profiles would only come from those personal profiles meeting those two personal characteristics. The above steps can be performed in any order. As just one example, the search for personal profiles can be conducted before calculating the reduced image data set for the target image.

A comparison is then performed between the reduced image data set F of the target image and the subset of reduced image data sets B that have the personal characteristic defined in the personal profile search. The goal is to find the distance between reduced image data sets within the face space of all the faces. One way to do this is to calculate the Euclidean distance. There are other methods for providing this calculation, such as Mahalanobis. The loop for comparing data set F against each of the reduced image data sets B is shown in blocks 610 through 616 of FIGS. 6A and 6B. The distance calculated is stored as S(i).

After all of the values of S(i) are calculated, S(i) is sorted in block 620 so that the lowest values, or closest matches between the target image and the images from the personal profiles, can be determined. The search results can then be provided to the user by sending the personal profiles of the closest matches as shown in block 622. For example, the five personal profiles that meet the personal characteristic and have the five smallest calculated distances within the face space (i.e., the five most similar pictures) can be sent to the user.

In another aspect of the invention, the number of dimensions used by the system for producing search results (i.e., the comparison step) may vary depending on system resources. For example, in step 612, instead of using all the K dimensions in calculating the distances, only a portion of it is used, e.g. those dimensions with higher eigenvalues. By using less dimensions in calculating the distances, the search can then be run faster. This would permit the system to provide results in real time or near real time, even though the usage is heavy and system resources are limited. The number of dimensions used may also be made dependant on the time of day or other variables.

The search may also be performed when the user is off line or conducting other activities. The results may be presented to the user at a time subsequent to their initial search. Likewise, the search can be initiated as new personal profiles are created or new images are entered into the personal profile database. The system can then notify the user of new matches.

Eigenfaces have advantages over other techniques available, such as the systems speed and efficiency. Using eigenfaces is very fast, and able to functionally operate on lots of faces in very little time.

To complement eigenfaces, another approach has been developed called eigenfeatures. This combines facial metrics (measuring distance between facial features) with the eigenface approach. Another method, which is competing with the eigenface technique uses "fisherfaces," This method for facial recognition is less sensitive to variation in lighting and pose of the face than the method using eigenfaces. These additional approaches can also be used to implement the invention.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A network device to manage communications over a network, comprising:
   a transceiver to send and receive data over a network; and
   a processor that is operative to enable actions for:
   receiving a request to search a plurality of different personal profiles, each of the plurality of different personal profiles includes an image having a corresponding reduced image data set comprising a face space, wherein the request comprises a personal characteristic and a target image, and receiving the request comprises:

receiving, from a device associated with a personal profile from the plurality of different personal profiles, selection of the personal characteristic, and receiving, from the device associated with the personal profile, selection of the target image, the target image depicting at least one feature that is desirable in a potential match for the personal profile, wherein the at least one feature depicted by the target image comprises eyes or body type of the potential match;

calculating a reduced image data set for the target image, the reduced image data set comprising a target image face space;

retrieving from the plurality of different personal profiles a subset of personal profiles that contain a match to the personal characteristic;

retrieving from the subset of personal profiles a subset of reduced image data sets;

determining correlations between the reduced image data set for the target image and each reduced image data set in the subset of reduced image data sets based on the at least one feature;

ranking the subset of reduced image data sets associated with the personal characteristic according to the correlations; and providing at least one personal profile from the plurality of different personal profiles in an order determined based on the ranking of the subset of reduced image data sets.

2. The network device of claim 1, wherein the reduced image data set for an image constitutes a reduced set of data that retains principal characteristics of the image.

3. The network device of claim 1, wherein the step of calculating the reduced image data set for the target image further comprises:

calculating a face space multiplier;

processing the target image to produce a mean subtracted, normalized target image; and calculating the reduced image data set for the target image by multiplying the face space multiplier by the mean subtracted, normalized target image.

4. The network device of claim 3, wherein the face space multiplier contains a number of eigenvectors.

5. The network device of claim 4, wherein the number of eigenvectors in the face space multiplier is substantially less than the total possible number of eigenvectors.

6. The network device of claim 3, wherein the face space multiplier is calculated prior to receiving the request to search personal profiles.

7. The network device of claim 1, wherein the target image is received based on a selection of at least one of a set of generic features that mimic an image of an idealized person.

8. The network device of claim 1, wherein:

the target image has a number of data points;

the reduced image data set for the target image has a number of data points which is less than the number of data points contained in the target image; and the number of data points of the reduced image data set for the target image used to perform the determining and ranking is dependent on availability of system resources for performing the determining and ranking;

wherein the number of data points of the reduced image data is dynamically varied based on the availability of the system resources.

9. A method for managing a personal profile search over a network, comprising:

receiving a request to search a plurality of different personal profiles, each of the plurality of different personal profiles includes an image having a corresponding reduced image data set comprising a face space, wherein the request comprises a personal characteristic and a target image, and receiving the request comprises:

receiving, from a device associated with a personal profile from the plurality of different personal profiles, selection of the personal characteristic, and receiving, from the device associated with the personal profile, selection of the target image, the target image depicting at least one feature that is desirable in a potential match for the personal profile, wherein the at least one feature depicted by the target image comprises eyes or body type of the potential match;

calculating a reduced image data set for the target image, comprising a target image face space;

retrieving from the plurality of different personal profiles a subset of personal profiles that contain a match to the personal characteristic;

retrieving from the subset of personal profiles a subset of reduced image data sets;

determining correlations between the reduced image data set for the target image and each reduced image data set in the subset of reduced image data sets based on the at least one or more feature;

ranking the subset of reduced image data sets associated with the personal characteristic based on the correlations; and providing at least one personal profile from the plurality of different personal profiles in an order determined based on the ranking of the subset of reduced image data sets.

10. The method of claim 9, wherein:

the target image has a number of data points;

the reduced image data set for the target image has a number of data points which is less than the number of data points contained in the target image; and the number of data points of the reduced image data set for the target image used to perform the determining and ranking is dependent on availability of system resources for performing the determining and ranking.

11. The method of claim 10, wherein:

the number of data points of the reduced image data set is made dependent on availability of system resources by dynamically varying the dimension of the reduced image data set used to calculate the determining and ranking according to the availability of system resources for performing the determining and ranking.

12. The method of claim 9, wherein the target image is received based on a selection of at least one of a set of generic features that mimic an image of an idealized person.

13. A system for managing a personal profile search over a network, comprising:

a plurality of client devices, wherein each client device is configured to receive and send messages over the network; and a network device that is in communication with the plurality of client devices, and is configured and arranged to perform actions, including:

receiving a request for a personal profile search within a plurality of different personal profiles from one client device in the plurality of client devices, the one client device being associated with a personal profile from the plurality of different personal profiles, and each one of the plurality of different personal profiles includes a digitized image, wherein the request comprises a personal characteristic and a target image, and receiving the request comprises:

receiving, from the one client device, selection of the personal characteristic, and receiving, from the one client device, selection of the target image, the target image depicting at least one feature that is desirable in a potential match for the personal profile, wherein the at least one feature depicted by the target image comprises eyes or body type of the potential match;

calculating a reduced image data set for the target image comprising a target image face space;

querying a personal profile database having the plurality of different personal profiles for a subset of personal profiles that contain a match to the personal characteristic;

comparing the reduced image data set for the target image against digitized images associated with the subset of personal profiles that contain the match to the personal characteristic to determine which of the digitized images most closely resemble the target image based on the at least one desired feature;

sorting the digitized images based on the resemblance to the target image;

providing to the client device at least one personal profile from the plurality of different profiles in an order determined based on the ranking of the digitized images.

14. The system of claim 13, further comprising:

calculating percentages of correlation between each of the digitized images and the target image; and transmitting the percentages of correlation to the client device.

15. The system of claim 13, wherein the target image is received based on a selection of at least one of a set of generic features that mimic an image of an idealized person.

16. The system of claim 13, wherein:

the target image has a number of data points;

the reduced image data set for the target image has a number of data points which is less than the number of data points contained in the target image; and the number of data points of the reduced image data set for the target image used to perform the determining and ranking is dependent on availability of system resources for performing the determining and ranking; wherein the number of data points of the reduced image data is dynamically varied based on the availability of the system resources.

17. A machine-readable tangible and non-transitory medium having information recorded thereon for managing a personal profile search over a network, wherein the information, when read by the machine, causes the machine to perform the following:

receiving a request to search a plurality of different personal profiles, each of the plurality of different personal profiles including an image having a corresponding reduced image data set comprising a face space, wherein the request comprises a personal characteristic and a target image, and receiving the request comprises:

receiving, from a device associated with a personal profile from the plurality of different personal profiles, selection of the personal characteristic, and receiving, from the device associated with the personal profile, selection of the target image, the target image depicting at least one feature that is desirable in a potential match for the personal profile, wherein the at least one feature depicted by the target image comprises eyes or body type of the potential match;

calculating a reduce image data set for the target image comprising a target image face space;

retrieving from the plurality of different personal profiles a subset of personal profiles that contain a match to the personal characteristic;

retrieving from the subset of personal profiles a subset of reduced image data sets;

determining correlations between the reduced image data set for the target image and each reduced image data set in the subset of reduced image data sets based on the at least one desired feature;

ranking the subset of reduced image data sets associated with the personal characteristic based on the correlations; and providing at least one personal profile from the plurality of different personal profiles in an order determined based on the ranking of the subset of reduced image data sets.

18. The machine-readable tangible and non-transitory medium of claim 17, wherein the target image is received based on a selection of at least one of a set of generic features that mimic an image of an idealized person.

19. The machine-readable tangible and non-transitory medium of claim 17, wherein:

the target image has a number of data points;

the reduced image data set for the target image has a number of data points which is less than the number of data points contained in the target image; and the number of data points of the reduced image data set for the target image used to perform the determining and ranking is dependent on availability of system resources for performing the determining and ranking; wherein the number of data points of the reduced image data is dynamically varied based on the availability of the system resources.

* * * * *